(12) United States Patent
Hao et al.

(10) Patent No.: US 10,578,896 B2
(45) Date of Patent: Mar. 3, 2020

(54) ARRAY SUBSTRATE, METHOD FOR CONTROLLING THE SAME, DISPLAY PANEL, AND DISPLAY DEVICE

(71) Applicant: BOE Technology Group Co., Ltd., Beijing (CN)

(72) Inventors: Xueguang Hao, Beijing (CN); Yong Qiao, Beijing (CN); Xinyin Wu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 97 days.

(21) Appl. No.: 15/909,730

(22) Filed: Mar. 1, 2018

(65) Prior Publication Data

US 2019/0079326 A1    Mar. 14, 2019

(30) Foreign Application Priority Data

Sep. 8, 2017   (CN) .......................... 2017 1 0803922

(51) Int. Cl.
*G09G 3/36* (2006.01)
*G02F 1/133* (2006.01)

(52) U.S. Cl.
CPC .......... *G02F 1/13306* (2013.01); *G09G 3/36* (2013.01); *G09G 3/3614* (2013.01); *G09G 2300/04* (2013.01); *G09G 2330/021* (2013.01)

(58) Field of Classification Search
CPC .... G02F 1/13306; G09G 3/36; G09G 3/3614; G09G 2300/04; G09G 2330/021
See application file for complete search history.

(56) References Cited

U.S. PATENT DOCUMENTS

2012/0162165 A1*   6/2012   Lee .................. G09G 3/006
345/206

* cited by examiner

*Primary Examiner* — Robert J Michaud
(74) *Attorney, Agent, or Firm* — Arent Fox LLP; Michael Fainberg

(57) ABSTRACT

The disclosure discloses an array substrate, a method for controlling the same, a display panel and a display device. The array substrate includes data lines, a control circuit, a discharge circuit, a control signal terminal and a voltage output circuit; the control circuit is configured to control an operation of the discharge circuit; the voltage output circuit is configured to output a preset voltage signal with a voltage value between grayscale voltage with positive and negative polarities required for the array substrate; and the discharge circuit is configured to be controlled by the control circuit, in a period of time between two adjacent frames of images being displayed, to control the data lines to be electrically connected with the voltage output circuit, and in a period of time of any one frame of image being displayed, to control the data lines to be electrically disconnected with the voltage output circuit.

20 Claims, 5 Drawing Sheets

ARRAY SUBSTRATE, METHOD FOR CONTROLLING THE SAME, DISPLAY PANEL, AND DISPLAY DEVICE

CROSS-REFERENCE TO RELATED APPLICATION

This Application claims priority to Chinese Patent Application No. 201710803922.X, filed on Sep. 8, 2017, the content of which is incorporated by reference in the entirety.

TECHNICAL FIELD

The present disclosure relates to the field of display technologies, and particularly to an array substrate, a method for controlling the same, a display panel, and a display device.

DESCRIPTION OF THE RELATED ART

A Thin Film Transistor Liquid Crystal Display (TFT-LCD) panel is a currently common flat panel display, and it has been widely applied to modern digital information devices due to its small volume, low consumption, no radiation, high resolution, and other advantages.

In a data drive method of the related art, pixel voltage signals output by a data drive chip generally include a positive polarity pixel voltage signal and a negative polarity pixel voltage signal, so there is a large range of the pixel voltage signals output by each data drive chip, where the dot inversion, two-dot-per-row inversion, two-dot-per-column inversion, and other drive modes can alleviate flicking and crosstalk, and improve the quality of a displayed image. However, when these drive modes are applied to a large-size high-resolution liquid crystal display product with a high refresh frequency, the data drive chip needs to output a larger range of pixel voltage signals, so there may be a problem of too high power consumption of the data drive chip.

SUMMARY

Embodiments of the disclosure provide an array substrate, a method for controlling the same, a display panel, and a display device.

In one aspect, an embodiment of the disclosure provides an array substrate including a base substrate, and several data lines arranged in an array on the base substrate, wherein the array substrate further includes a control circuit, a discharge circuit, a control signal terminal, and a voltage output circuit, which are located on the base substrate, wherein: all of the control circuit, the discharge circuit, the control signal terminal, and the voltage output circuit are located in a non-display area of the array substrate; the control circuit is electrically connected between the control signal terminal and the discharge circuit, and configured to receive a control signal inputted by the control signal terminal, and to control an operation of the discharge circuit according to the control signal; the voltage output circuit is electrically connected with the discharge circuit, and configured to output a preset voltage signal with a voltage value between grayscale voltage with positive and negative polarities required for the array substrate; and the discharge circuit is electrically connected between the data lines and the voltage output circuit, and configured to be controlled by the control circuit, in a period of time between two adjacent frames of images being displayed, to control the data lines to be electrically connected with the voltage output circuit, and to be controlled by the control circuit, in a period of time of any one frame of image being displayed, to control the data lines to be electrically disconnected with the voltage output circuit.

In another aspect, an embodiment of the disclosure further provides a display panel including the array substrate above.

In still another aspect, an embodiment of the disclosure further provides a display device including the display panel above.

In still another aspect, an embodiment of the disclosure further provides a method for controlling the array substrate above, the method including: controlling, by the control circuit, the discharge circuit in a period of time between two adjacent frames of images being displayed, to control the data lines to be electrically connected with the voltage output circuit, so that a preset voltage signal output by the voltage output circuit is received on the data lines; and controlling, by the control circuit, the discharge circuit in a period of time of any one frame of image being displayed, to control the data lines to be electrically disconnected with the voltage output circuit.

BRIEF DESCRIPTION OF THE DRAWINGS

In order to make the technical solutions according to the embodiments of the present disclosure more apparent, the drawings to which a description of the embodiments refers will be briefly introduced below, and apparently the drawings to be described below are merely illustrative of some of the embodiments of the present disclosure, and those ordinarily skilled in the art can derive from these drawings other drawings without any inventive effort.

DETAILED DESCRIPTION OF THE EMBODIMENTS

Figure 1:
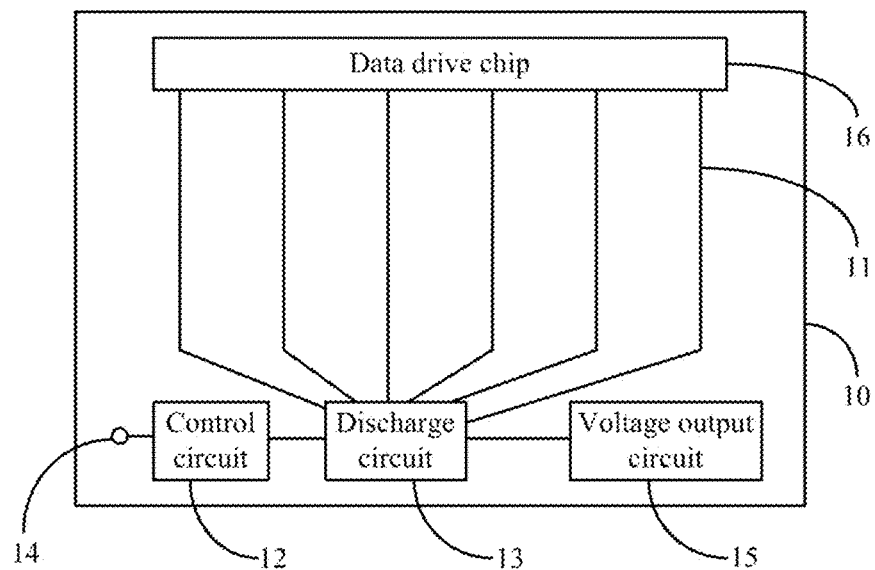
FIG. 1 is a schematic structural diagram of an array substrate according to an embodiment of the disclosure.

The power consumption of the data drive chip is typically lowered in the related art by designing a charge sharing circuit therein; and in a particular implementation, two adjacent rows of data lines are short-circuited in the data drive chip for a high-level period of time between two adjacent frames of images, where in this period of time, grayscale voltage with positive and negative polarities in the preceding frame is neutralized so that the grayscale voltage goes back respectively to a neutral potential around common voltage (VCOM), and when grayscale voltage in the next frame is inverted, the grayscale voltage with the positive and negative polarities can be simply charged or discharged to target voltage from the neutral potential, thus lowering the power consumption.

However the design of the charge sharing circuit structure in the data drive chip in the related art may complicate the fabrication process thereof in that different charge sharing circuit structures need to be fabricated for different inversion modes, so that the data drive chip cannot be universally applied, thus greatly increasing the cost of fabricating the data drive chip.

The embodiments of the disclosure provide an array substrate, a method for controlling the same, a display panel, and a display device so as to lower power consumption of the data drive chip without increasing the cost of the data drive chip.

In order to make the objects, technical solutions, and advantages of the embodiments of the disclosure more apparent, the disclosure will be described below in further details with reference to the drawings. Apparently the embodiments to be described are only a part but not all of the embodiments of the disclosure. Based upon the embodiments of the disclosure here, all of other embodiments which can occur to those ordinarily skilled in the art without any inventive effort shall come into the scope of the disclosure as claimed.

An array substrate according to the embodiments of the disclosure will be described below in details with reference to the drawings.

The shapes and sizes of respective components in the drawings are not intended to reflect any real proportion thereof, but merely intended to illustrate the content of the disclosure.

As illustrated in FIG. 1, embodiments of the disclosure provide an array substrate, the array substrate includes a base substrate 10, and several data lines 11 arranged in an array on the base substrate 10, and further includes a control circuit 12, a discharge circuit 13, a control signal terminal 14, and a voltage output circuit 15, which are located on the base substrate 10, where: all of the control circuit 12, the discharge circuit 13, the control signal terminal 14, and the voltage output circuit 15 are located in a non-display area of the array substrate; the control circuit 12 is electrically connected between the control signal terminal 14 and the discharge circuit 13, and configured to receive a control signal inputted by the control signal terminal 14, and to control an operation of the discharge circuit 13 according to the control signal; the voltage output circuit 15 is electrically connected with the discharge circuit 13, and configured to output a preset voltage signal with a voltage value between grayscale voltage with positive and negative polarities required for the array substrate; and the discharge circuit 13 is electrically connected between the data lines 11 and the voltage output circuit 15, and configured to be controlled by the control circuit 12, in a period of time between two adjacent frames of images being displayed, to control the data lines 11 to be electrically connected with the voltage output circuit 15, and to be controlled by the control circuit 12, in a period of time of any one frame of image being displayed, to control the data lines 11 to be electrically disconnected with the voltage output circuit 15.

In the array substrate according to the embodiments of the disclosure, the array substrate includes the control circuit, the discharge circuit, the control signal terminal, and the voltage output circuit, which are located on the base substrate; where the control circuit is configured to receive the control signal inputted by the control signal terminal, and to control the operation of the discharge circuit according to the control signal; and the discharge circuit is configured to be controlled by the control circuit, in the period of time of the two adjacent frames of images being displayed, to control the data lines to be electrically connected with the voltage output circuit. Since the voltage output circuit is configured to output the preset voltage signal with the voltage value between the grayscale voltage with the positive and negative polarities required for the array substrate, a voltage value on the data lines is changed to the voltage value of the preset voltage signal in the period of time of the two adjacent frames of images being displayed, and since the voltage value of the preset voltage signal lies between the grayscale voltage with the positive and negative polarities required for the array substrate, the grayscale voltage with the positive and negative polarities in the preceding frame can be partially neutralized in the period of time of the two adjacent frames of images being displayed, and when the grayscale voltage in the next frame is inverted, the grayscale voltage with the positive and negative polarities can be simply charged or discharged to target voltage from the voltage value of the preset voltage signal. As compared with the related art, no different charge sharing circuit structures will be fabricated for different inversion modes in the embodiments of the disclosure, so that power consumption of the data drive chip can be lowered without increasing the cost of the data drive chip. Furthermore the discharge circuit in the embodiments of the disclosure is further configured to be controlled by the control circuit, in the period of time of any one frame of image being displayed, to control the data lines to be electrically disconnected with the voltage output circuit, and at this time, only a signal of the data drive chip is received on the data lines, so normal displaying on a display panel including the array substrate will not be affected.

Figure 2:
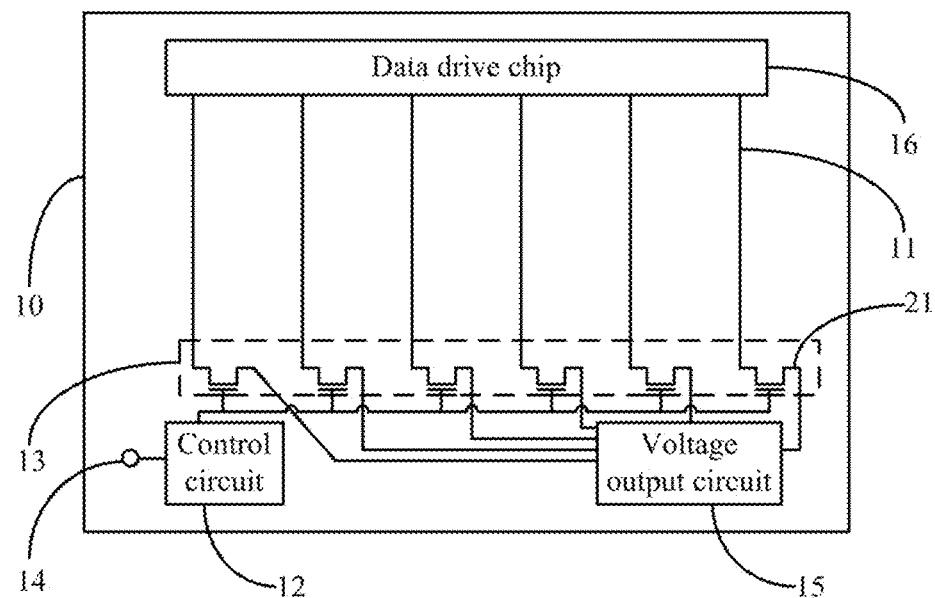
FIG. 2 is another schematic structural diagram of an array substrate according to an embodiment of the disclosure.

In some embodiments, as illustrated in FIG. 2, the discharge circuit 13 in the embodiments of the disclosure includes several switch elements 21, each of the data lines 11 corresponds to at least one of the switch elements 21; and a first terminal of each of the switch elements 21 is electrically connected with a data line 11 corresponding to the each of the switch elements 21, a second terminal of the each of the switch elements is electrically connected with the control circuit 12, and a third terminal of the each of the switch elements is electrically connected with the voltage output circuit 15.

In some embodiments, the switch elements 21 in the embodiments of the disclosure are amorphous silicon thin film transistors or poly-silicon thin film transistors or metal-oxide thin film transistors. As illustrated in FIG. 2, gates of the amorphous silicon thin film transistors, gates of the poly-silicon thin film transistors, or gates of the metal-oxide thin film transistors are electrically connected with the control circuit. In some embodiments, the control signal received by the control circuit in the embodiments of the disclosure can be a high-level (VDD) signal, or can be a low-level (VSS) signal.

In some embodiments, as illustrated in FIG. 2, in the embodiments of the disclosure, the switch elements 21 are P-type transistors, or the switch elements 21 are N-type transistors, although FIG. 2 only illustrates the switch elements 21 which are N-type transistors. When the switch elements 21 are P-type transistors, the control signal received by the control circuit 12 in the embodiments of the disclosure in the period of time of the two adjacent frames of images being displayed can be a low-level signal, and the control circuit 12 controls all the switch elements 21 to be turned on, according to the low-level signal, and at this time, the data lines 11 are electrically connected with the voltage output circuit 15; and the control signal received by the control circuit 12 in the period of time of any one frame of image being displayed can be a high-level signal, and the control circuit 12 controls all the switch elements 21 to be turned off, according to the high-level signal, and at this time, the data lines 11 are electrically disconnected with the voltage output circuit 15, and only a signal of the data drive chip 16 is received on the data lines 11, where a particular operating process of the data drive chip 16 is the same as in the related art, so a repeated description thereof will be omitted here.

As illustrated in FIG. 2, when the switch elements 21 are N-type transistors, the control signal received by the control circuit 12 in the embodiments of the disclosure in the period of time of the two adjacent frames of images being displayed can be a high-level signal, and the control circuit 12 controls all the switch elements 21 to be turned on, according to the high-level signal, and at this time, the data lines 11 are electrically connected with the voltage output circuit 15; and the control signal received by the control circuit 12 in the period of time of any one frame of image being displayed can be a low-level signal, and the control circuit 12 controls all the switch elements 21 to be turned off, according to the low-level signal, and at this time, the data lines 11 are electrically disconnected with the voltage output circuit 15.

Figure 3:
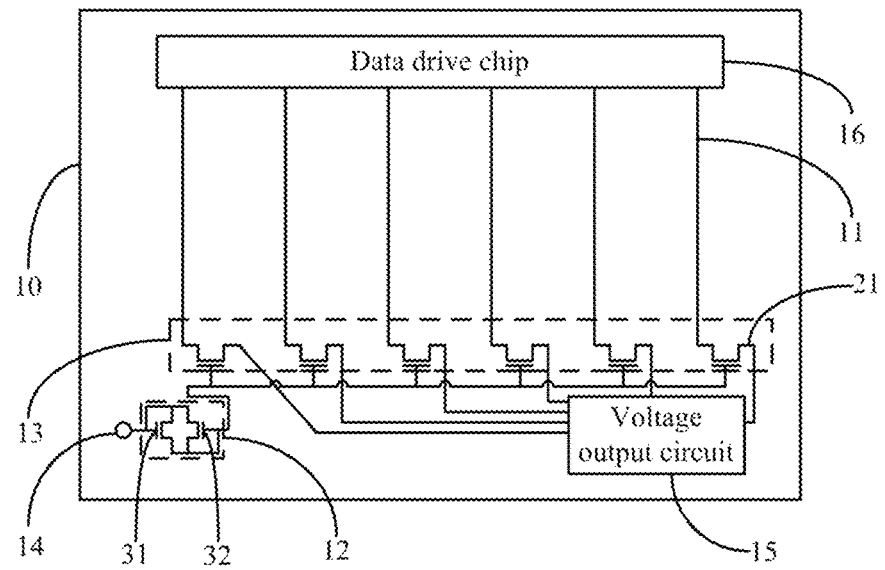
FIG. 3 is still another schematic structural diagram of an array substrate according to an embodiment of the disclosure.

In some embodiments, as illustrated in FIG. 3, the control circuit in the embodiments of the disclosure includes at least a first switch unit 31 and a second switch unit 32, where a first terminal of the first switch unit 31 is electrically connected with the control signal terminal 14, and a first terminal of the second switch unit 32 is electrically connected with the discharge circuit 13; and a second terminal of the first switch unit 31 is electrically connected with a second terminal of the second switch unit 32, and a third terminal of the first switch unit 31 is electrically connected with a third terminal of the second switch unit 32.

In some embodiments, the first switch unit 31 in the embodiments of the disclosure is an amorphous silicon thin film transistor or a poly-silicon thin film transistor or a metal-oxide thin film transistor; and the second switch unit 32 is an amorphous silicon thin film transistor or a poly-silicon thin film transistor or a metal-oxide thin film transistor.

In some embodiments, as illustrated in FIG. 3, the first switch unit 31 in the embodiments of the disclosure is a P-type transistor, and the second switch unit 32 is a P-type transistor; or the first switch unit 31 is an N-type transistor, and the second switch unit 32 is an N-type transistor, although FIG. 3 only illustrates the first switch unit 31 which is an N-type transistor, and the second switch unit 32 which is an N-type transistor.

In some embodiments, as illustrated in FIG. 3, when the switch elements 21 are N-type transistors, the first switch unit 31 is an N-type transistor, and the second switch unit 32 is an N-type transistor; the control signal received by the control circuit 12 in the period of time of the two adjacent frames of images being displayed can be a high-level signal, and at this time, all of the switch elements 21, the first switch unit 31 and the second switch unit 32 are turned on.

Figure 4A:
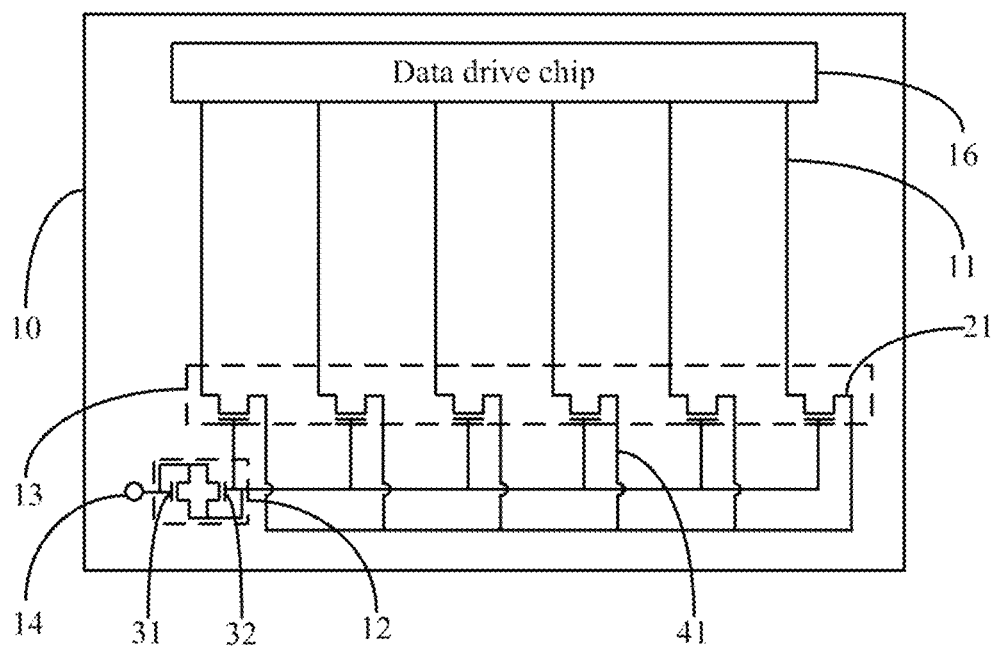
FIG. 4A and FIG. 4B are further schematic structural diagrams of an array substrate according to an embodiment of the disclosure.
Figure 4B:
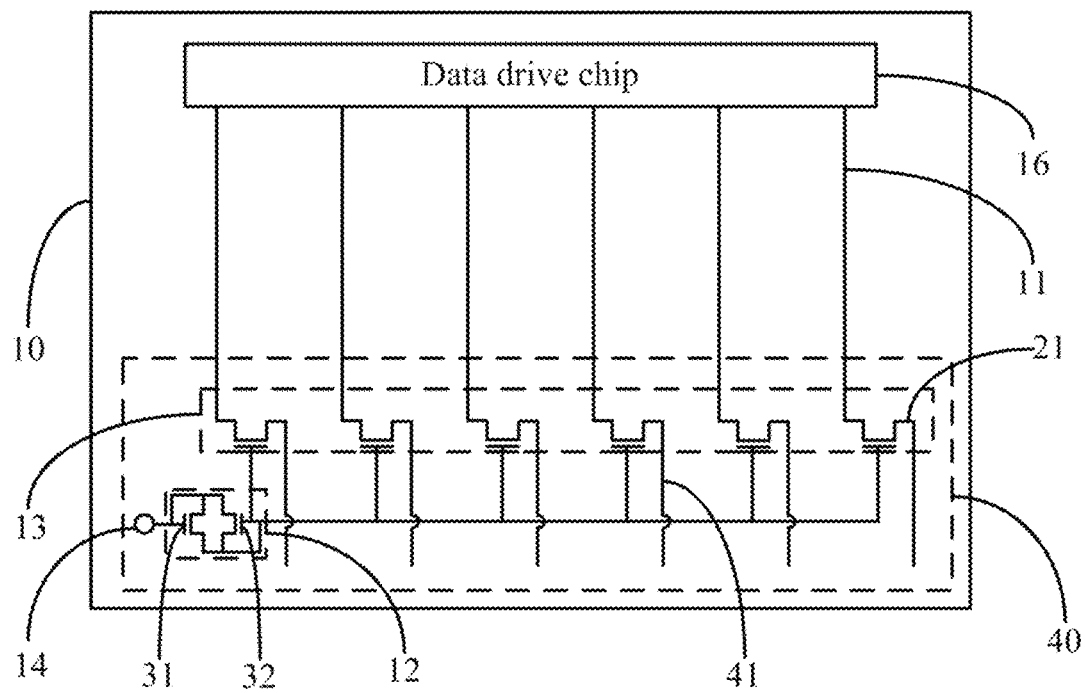

In some embodiments, as illustrated in FIG. 4A and FIG. 4B, the voltage output circuit 15 in the embodiments of the disclosure includes several preset voltage signal lines 41, where each of the data lines 11 corresponds to one of the preset voltage signal lines 41, and does not intersect therewith, and all the preset voltage signal lines 41 are electrically connected together as illustrated in FIG. 4A; or each of the preset voltage signal lines 41 is arranged floating as illustrated in FIG. 4B.

In some embodiments, as illustrated in FIG. 4A and FIG. 4B, all the preset voltage signal lines 41 in the embodiments of the disclosure are arranged in parallel, and the preset voltage signal lines 41 are arranged parallel to the data lines 11. In some embodiments, the preset voltage signal lines 41 in the embodiments of the disclosure are arranged at the same layer as the data lines 11, so that both the preset voltage signal lines 41 and the data lines can be fabricated in the same patterning process in the embodiments of the disclosure in a practical production process to thereby save a production period of time, and a production cost.

Figure 5:
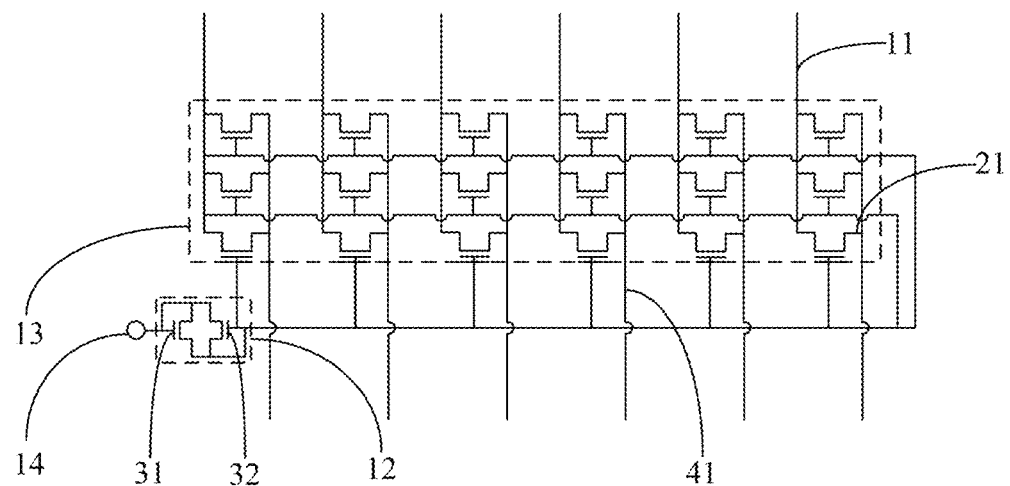
FIG. 5 is a schematic structural diagram of an area 40 in FIG. 4B in an enlarged view.

In some embodiments, FIG. 5 illustrates an enlarged view of an area 40 in FIG. 4B. Each of the data lines in the discharge circuit 13 in the embodiments of the disclosure corresponds to a plurality of switch elements 21, and FIG. 5 only illustrates a data line 11 corresponding to three switch elements 21, so that charges on the data lines can be released more quickly.

In some embodiments, the preset voltage signal lines 41 in the embodiments of the disclosure are configured to receive a common voltage signal, so that a signal received on the data lines 11 in the period of time of the two adjacent frames of images being displayed in the embodiments of the disclosure is the common voltage signal, where the common voltage signal can neutralize the grayscale voltage with the positive and negative polarities in the preceding frame, and when the grayscale voltage in the next frame is inverted, the grayscale voltage with the positive and negative polarities can be simply charged or discharged to the target voltage from the voltage value of the common voltage signal, thus lowering the power consumption of the data drive chip.

A process of lowering the power consumption of the data drive chip according to the embodiments of the disclosure will be described below in connection with two embodiments thereof. And it is assumed that a common voltage signal is received on the preset voltage signal lines in the embodiments of the disclosure.

Figure 6A:
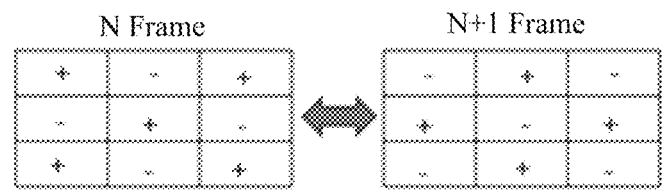
FIG. 6A is a schematic diagram of a dot inversion mode according to an embodiment of the disclosure.
Figure 6B:
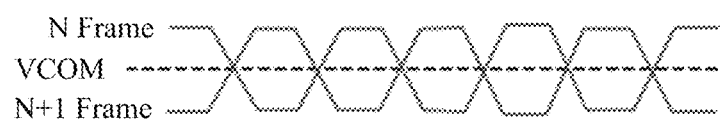
FIG. 6B is a schematic time sequence diagram of a dot inversion mode according to an embodiment of the disclosure.

In one embodiment, as illustrated in FIG. 6A, in a dot inversion mode, a common voltage signal is received on the preset voltage signal lines in the array substrate according to the embodiments of the disclosure in a period of time between the N-th frame and the (N+1)-th frame, where N is a positive integer greater than or equal to 1, where voltage on the data lines are common voltage, and the voltage on the data lines can be simply charged or discharged from the common voltage to target voltage in a period of time of the (N+1)-th frame of image being displayed. And as illustrated in FIG. 6B, since power consumption of a drive circuit of the data lines is in proportion to a variation $\Delta V$ in drive voltage of the data lines, the power consumption of the data drive chip can be halved in theory; and also the potential of the common voltage will not fluctuate, so the quality of a displayed image will not be affected.

Figure 7A:
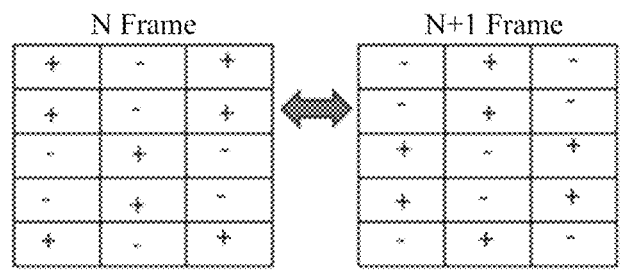
FIG. 7A is a schematic diagram of a two-dot inversion mode according to an embodiment of the disclosure.
Figure 7B:
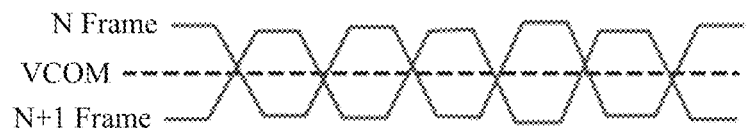
FIG. 7B is a schematic time sequence diagram of a two-dot inversion mode according to an embodiment of the disclosure.

In another embodiment, as illustrated in FIG. 7A, in a two-dot-inversion mode, a common voltage signal is received on the preset voltage signal lines in the array substrate according to the embodiments of the disclosure in a period of time between the N-th frame and the (N+1)-th frame, where voltage on the data lines are common voltage, and the voltage on the data lines can be simply charged or discharged from the common voltage to target voltage in a period of time of the (N+1)-th frame of image being displayed. And as illustrated in FIG. 7B, since power consumption of a drive circuit of the data lines is in proportion to a variation ΔV in drive voltage of the data lines, the power consumption of the data drive chip can be halved in theory.

Based upon the same inventive concept, the embodiments of the disclosure further provide a display panel including the array substrate above according to the embodiments of the disclosure, where the display panel can have the power consumption of the data drive chip lowered in the period of time of the two adjacent frames of images being displayed, and can display normally in the period of time of any one frame of image being displayed.

Based upon the same inventive concept, the embodiments of the disclosure further provide a display device including the array panel above according to the embodiments of the disclosure, where the display device can be a mobile phone, a tablet computer, a liquid crystal TV set, an Organic Light Emitting Diode (OLED) TV set, a notebook computer, a digital photo frame, a navigator, or any product or component with a display function. Other components indispensable to the display device shall readily occur to those ordinarily in the art, so a repeated description thereof will be omitted here.

Figure 8:
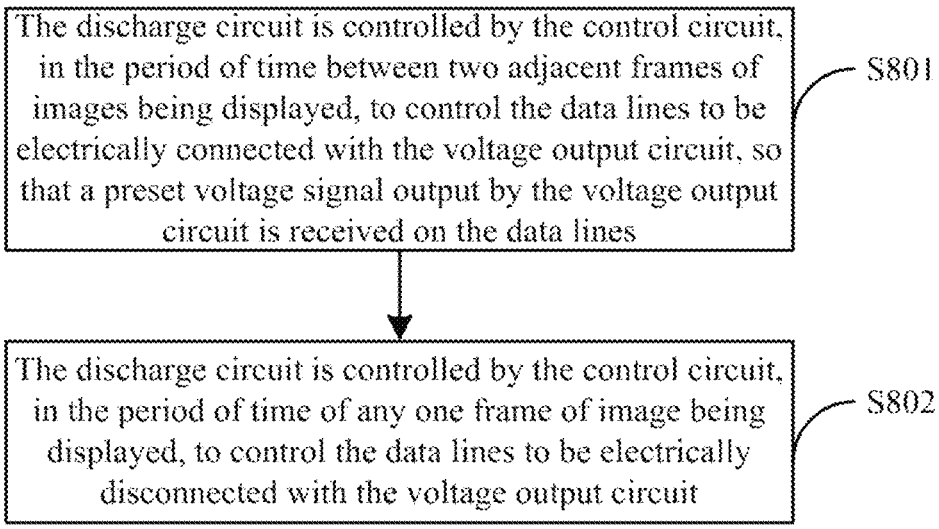
FIG. 8 is a flow chart of a method for controlling an array substrate according to an embodiment of the disclosure.

Based upon the same inventive concept, the embodiments of the disclosure further provide a method for controlling the array substrate above, and as illustrated in FIG. 8, the method includes following operations.

In the operation S801, the discharge circuit is controlled by the control circuit, in the period of time between two adjacent frames of images being displayed, to control the data lines to be electrically connected with the voltage output circuit, so that a preset voltage signal output by the voltage output circuit is received on the data lines.

In the operation S802, the discharge circuit is controlled by the control circuit, in the period of time of any one frame of image being displayed, to control the data lines to be electrically disconnected with the voltage output circuit.

In some embodiments, the preset voltage signal in the embodiments of the disclosure is a common voltage signal, so that voltage on the data lines in the embodiments of the disclosure is common voltage in a period of time between the adjacent N-th and (N+1)-th frames, and the voltage on the data lines can be simply charged or discharged to a target potential in a period of time of the (N+1)-th frame of image being displayed, thus lowering power consumption of the data drive chip.

In summary, embodiments of the disclosure provide an array substrate, a method for controlling the same, a display panel, and a display device. Where the array substrate according to the embodiments of the disclosure includes a control circuit, a discharge circuit, a control signal terminal, and a voltage output circuit, which are located on a base substrate; where the control circuit is configured to receive a control signal inputted by the control signal terminal, and to control an operation of the discharge circuit according to the control signal; and the discharge circuit is configured to be controlled by the control circuit, in a period of time of two adjacent frames of images being displayed, to control the data lines to be electrically connected with the voltage output circuit. Since the voltage output circuit is configured to output a preset voltage signal with voltage value between grayscale voltage with positive and negative polarities required for the array substrate, a voltage value on the data lines is changed to the voltage value of the preset voltage signal in the period of time of the two adjacent frames of images being displayed, and since the voltage value of the preset voltage signal lies between the grayscale voltage with the positive and negative polarities required for the array substrate, the grayscale voltage with the positive and negative polarities in the preceding frame can be partially neutralized in the period of time of the two adjacent frames of images being displayed, and when the grayscale voltage in the next frame is inverted, the grayscale voltage with the positive and negative polarities can be simply charged or discharged to target voltage from the voltage value of the preset voltage signal. As compared with the related art, no different charge sharing circuit structures will be fabricated for different inversion modes in the embodiments of the disclosure, so that power consumption of the data drive chip can be lowered without increasing the cost of the data drive chip.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An array substrate, comprising a base substrate, and several data lines arranged in an array on the base substrate, wherein the array substrate further comprises a control circuit, a discharge circuit, a control signal terminal, and a voltage output circuit, which are located on the base substrate, wherein:
   all of the control circuit, the discharge circuit, the control signal terminal, and the voltage output circuit are located in a non-display area of the array substrate;
   the control circuit is electrically connected between the control signal terminal and the discharge circuit, and configured to receive a control signal inputted by the control signal terminal, and to control an operation of the discharge circuit according to the control signal;
   the voltage output circuit is electrically connected with the discharge circuit, and configured to output a preset voltage signal with a voltage value between grayscale voltage with positive and negative polarities required for the array substrate; and
   the discharge circuit is electrically connected between the data lines and the voltage output circuit, and configured to be controlled by the control circuit, in a period of time between two adjacent frames of images being displayed, to control the data lines to be electrically connected with the voltage output circuit, and
   to be controlled by the control circuit, in a period of time of any one frame of image being displayed, to control the data lines to be electrically disconnected with the voltage output circuit.

2. The array substrate according to claim 1, wherein the discharge circuit comprises several switch elements, and each of the data lines corresponds to at least one of the switch elements; and
   a first terminal of each of the switch elements is electrically connected with a data line corresponding to the each of the switch elements, a second terminal of the each of the switch elements is electrically connected with the control circuit, and a third terminal of the each of the switch elements is electrically connected with the voltage output circuit.

3. The array substrate according to claim 1, wherein the control circuit comprises at least a first switch unit and a second switch unit, wherein a first terminal of the first switch unit is electrically connected with the control signal terminal, and a first terminal of the second switch unit is electrically connected with the discharge circuit; and
a second terminal of the first switch unit is electrically connected with a second terminal of the second switch unit, and a third terminal of the first switch unit is electrically connected with a third terminal of the second switch unit.

4. The array substrate according to claim 2, wherein the switch elements are amorphous silicon thin film transistors or poly-silicon thin film transistors or metal-oxide thin film transistors; and
gates of the amorphous silicon thin film transistors, gates of the poly-silicon thin film transistors, or gates of the metal-oxide thin film transistors are electrically connected with the control circuit.

5. The array substrate according to claim 1, wherein the voltage output circuit comprises several preset voltage signal lines;
each of the data lines corresponds to one of the preset voltage signal lines, and does not intersect therewith, and all the preset voltage signal lines are electrically connected together; or
each of the preset voltage signal lines is arranged floating.

6. The array substrate according to claim 5, wherein all the preset voltage signal lines are arranged in parallel, and the preset voltage signal lines are arranged parallel to the data lines.

7. The array substrate according to claim 6, wherein the preset voltage signal lines are arranged at a same layer as the data lines.

8. The array substrate according to claim 2, wherein the switch elements are P-type transistors, or the switch elements are N-type transistors.

9. The array substrate according to claim 3, wherein the first switch unit is an amorphous silicon thin film transistor or a poly-silicon thin film transistor or a metal-oxide thin film transistor; and
the second switch unit is an amorphous silicon thin film transistor or a poly-silicon thin film transistor or a metal-oxide thin film transistor.

10. The array substrate according to claim 3, wherein the first switch unit is a P-type transistor, and the second switch unit is a P-type transistor; or
the first switch unit is an N-type transistor, and the second switch unit is an N-type transistor.

11. The array substrate according to claim 5, wherein a common voltage signal is received on the preset voltage signal lines.

12. A display panel, comprising an array substrate; wherein the array substrate comprises a base substrate, and several data lines arranged in an array on the base substrate, wherein the array substrate further comprises a control circuit, a discharge circuit, a control signal terminal, and a voltage output circuit, which are located on the base substrate, wherein:
all of the control circuit, the discharge circuit, the control signal terminal, and the voltage output circuit are located in a non-display area of the array substrate;
the control circuit is electrically connected between the control signal terminal and the discharge circuit, and configured to receive a control signal inputted by the control signal terminal, and to control an operation of the discharge circuit according to the control signal;
the voltage output circuit is electrically connected with the discharge circuit, and configured to output a preset voltage signal with a voltage value between grayscale voltage with positive and negative polarities required for the array substrate; and
the discharge circuit is electrically connected between the data lines and the voltage output circuit, and configured to be controlled by the control circuit, in a period of time between two adjacent frames of images being displayed, to control the data lines to be electrically connected with the voltage output circuit, and
to be controlled by the control circuit, in a period of time of any one frame of image being displayed, to control the data lines to be electrically disconnected with the voltage output circuit.

13. The display panel according to claim 12, wherein the discharge circuit comprises several switch elements, and each of the data lines corresponds to at least one of the switch elements; and
a first terminal of each of the switch elements is electrically connected with a data line corresponding to the each of the switch elements, a second terminal of the each of the switch elements is electrically connected with the control circuit, and a third terminal of the each of the switch elements is electrically connected with the voltage output circuit.

14. The display panel according to claim 12, wherein the control circuit comprises at least a first switch unit and a second switch unit, wherein a first terminal of the first switch unit is electrically connected with the control signal terminal, and a first terminal of the second switch unit is electrically connected with the discharge circuit; and
a second terminal of the first switch unit is electrically connected with a second terminal of the second switch unit, and a third terminal of the first switch unit is electrically connected with a third terminal of the second switch unit.

15. The display panel according to claim 12, wherein the voltage output circuit comprises several preset voltage signal lines;
each of the data lines corresponds to one of the preset voltage signal lines, and does not intersect therewith, and all the preset voltage signal lines are electrically connected together; or
each of the preset voltage signal lines is arranged floating.

16. The display panel according to claim 15, wherein all the preset voltage signal lines are arranged in parallel, and the preset voltage signal lines are arranged parallel to the data lines.

17. The display panel according to claim 15, wherein a common voltage signal is received on the preset voltage signal lines.

18. A display device, comprising the display panel according to claim 12.

19. A method for controlling the array substrate according to claim 1, the method comprising:
controlling, by the control circuit, the discharge circuit in the period of time between two adjacent frames of images being displayed, to control the data lines to be electrically connected with the voltage output circuit, so that the preset voltage signal output by the voltage output circuit is received on the data lines; and
controlling, by the control circuit, the discharge circuit in the period of time of any one frame of image being displayed, to control the data lines to be electrically disconnected with the voltage output circuit.

20. The controlling method according to claim 19, wherein the preset voltage signal is a common voltage signal.

* * * * *